(12) United States Patent
Sferrazza

(10) Patent No.: US 7,138,045 B2
(45) Date of Patent: Nov. 21, 2006

(54) MULTI-PATH SPLIT CELL SPACER AND ELECTRODIALYSIS STACK DESIGN

(76) Inventor: Alois Sferrazza, 10312 N. River Trl., Knoxville, TN (US) 37922

(*) Notice: Subject to any disclaimer, the term of this patent is extended or adjusted under 35 U.S.C. 154(b) by 47 days.

(21) Appl. No.: 10/995,861

(22) Filed: Nov. 23, 2004

(65) Prior Publication Data
US 2005/0150768 A1    Jul. 14, 2005

Related U.S. Application Data

(63) Continuation of application No. 10/080,302, filed on Feb. 21, 2002, now abandoned.

(51) Int. Cl.
*B01D 61/42* (2006.01)
(52) U.S. Cl. .................. 205/523; 204/635; 204/636; 204/638; 204/639
(58) Field of Classification Search ............ 204/523, 204/635, 636, 638, 639
See application file for complete search history.

(56) References Cited

U.S. PATENT DOCUMENTS

| | | |
|---|---|---|
| 3,223,612 A | 12/1965 | Kwo-Wei Chen et al. |
| 3,235,481 A | 2/1966 | Zwart, Jr. |
| 3,291,716 A | 12/1966 | Cioffi |
| 3,405,047 A | 10/1968 | Kwo-Wei Chen et al. |
| 3,412,006 A | 11/1968 | Alexander et al. |
| 3,761,386 A | 9/1973 | Smith et al. |
| 3,878,086 A | 4/1975 | Haswell et al. |
| 4,172,779 A | 10/1979 | Yamaguchi et al. |
| 4,319,978 A | 3/1982 | Millman |
| 4,350,581 A | 9/1982 | Schmoldt et al. |
| 4,427,507 A | 1/1984 | van Aken et al. |
| 4,624,784 A | 11/1986 | Lefebvre |
| 4,676,908 A | 6/1987 | Ciepiela et al. |
| 4,737,260 A | 4/1988 | Strathmann et al. |
| 5,407,553 A | 4/1995 | Herron et al. |
| 5,702,582 A * | 12/1997 | Goldstein et al. ........... 204/632 |
| 5,891,328 A | 4/1999 | Goldstein |
| 5,948,230 A | 9/1999 | McRae |
| 5,972,191 A | 10/1999 | Mani |
| 6,117,297 A | 9/2000 | Goldstein |
| 6,162,361 A | 12/2000 | Adiga |
| 6,183,648 B1 | 2/2001 | Kozak et al. |
| 6,187,197 B1 | 2/2001 | Haddock |
| 6,221,255 B1 | 4/2001 | Vadoothker |

(Continued)

OTHER PUBLICATIONS

Haddock et al., "Recycling Used Engine Coolant Using High-Volume Stationary, Multiple Technology Equipment," Engine Coolant Testing: Fourth vol., pp. 250-260, no date.

*Primary Examiner*—Arun S. Phasge

(57) ABSTRACT

An electrodialysis method and apparatus include a source of concentrate fluid, a source of dilute fluid, a collector of treated concentrate fluid, a collector of dilute fluid, an anode and a cathode. A plurality of generally planar spacers are interleaved with a plurality of membranes to define a plurality of cells providing electrically conductive fluid connection between the anode and the cathode. Each of the spacers comprises a gasket that defines a first aperture and a second aperture. Each of said first and second apertures define an independent cell between interleaved membranes. The symmetrical, multiple split cell spacer configuration channels fluid flow through two or more narrow and elongated paths. The split cell arrangement allows for operation of the stack in parallel or in series. The invention improves the ion removal efficiency of a given membrane area, requires significantly less energy than other electrodialysis systems and substantially reduces stack assembly, materials and fabrication costs.

14 Claims, 7 Drawing Sheets

U.S. PATENT DOCUMENTS

| | | |
|---|---|---|
| 6,224,731 B1 | 5/2001 | Mani |
| 6,274,020 B1 | 8/2001 | Schmidt et al. |
| 6,294,066 B1 | 9/2001 | Mani |
| 6,331,236 B1 | 12/2001 | Mani |
| 6,406,547 B1 | 6/2002 | Donovan et al. |
| 6,406,548 B1 | 6/2002 | Donovan et al. |
| 6,440,222 B1 | 8/2002 | Donovan et al. |
| 6,508,936 B1 | 1/2003 | Hassan |
| 2002/0017491 A1 | 2/2002 | Haddock |

* cited by examiner

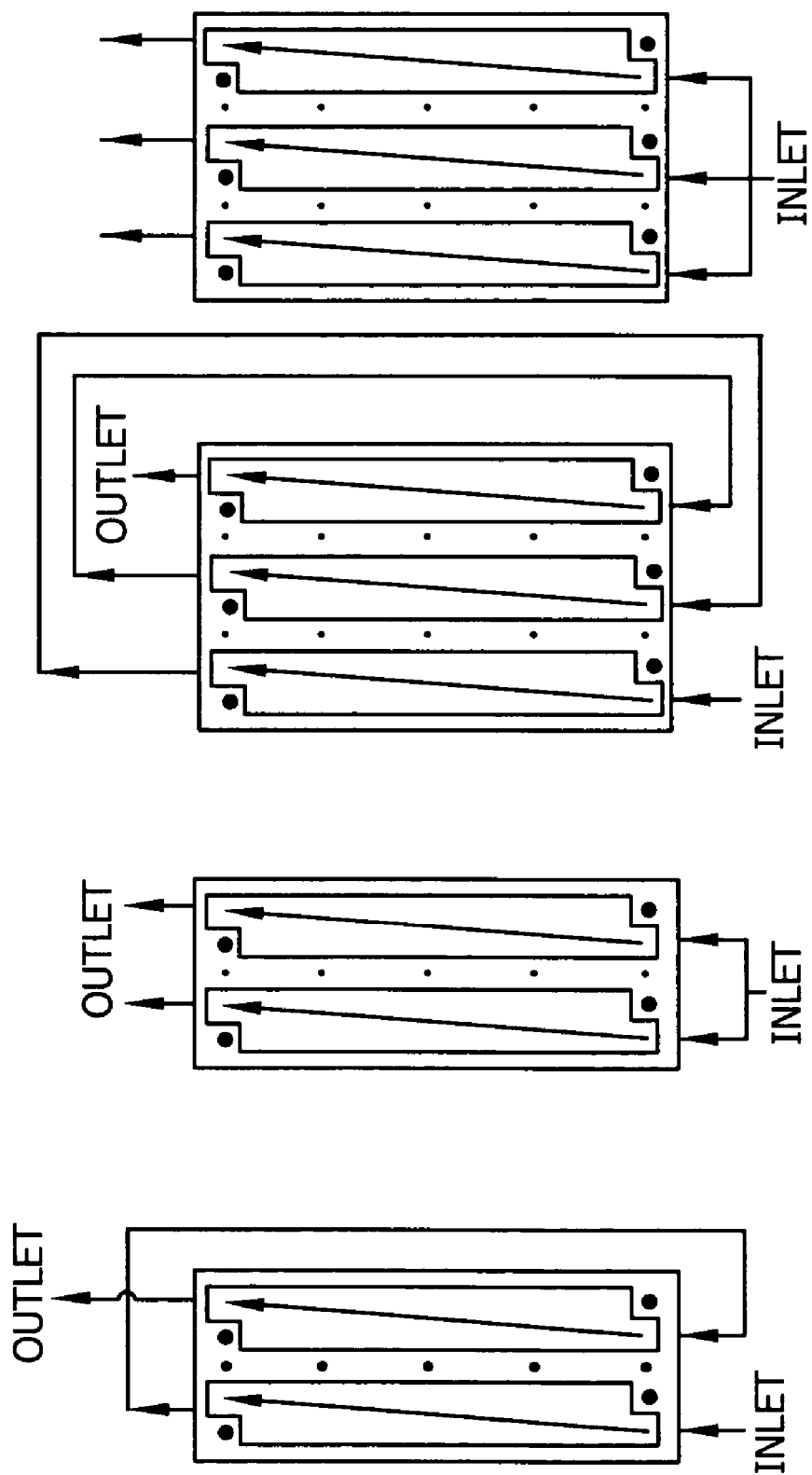

MULTI-PATH SPLIT CELL SPACER AND ELECTRODIALYSIS STACK DESIGN

CROSS-REFERENCE TO RELATED APPLICATIONS

This application is a continuation of U.S. patent application Ser. No. 10/080,302, filed Feb. 21, 2002 now abandoned, and also claims priority to PCT Application, Ser. No. PCT/US03/05185, filed Feb. 21, 2003.

STATEMENT REGARDING FEDERALLY SPONSORED RESEARCH OR DEVELOPMENT

Not Applicable

BACKGROUND OF THE INVENTION

1. Field of Invention

This invention pertains to a method and apparatus for the purification and reuse or disposal of polluted liquids.

More particularly, this invention pertains to an electrodialysis stack for the removal and concentration of ions from aqueous solutions and certain aqueous/organic solutions.

2. Description of the Related Art

There are presently a number of systems for treating and recycling aqueous and aqueous/organic waste streams on the market. Present state of the art systems, including de-ionization methods that are available to industrial waste stream generators, are deficient in their ability to consistently and economically produce a cleansed fluid of sufficient quality that can be continuously recycled and reused, especially in the case of small to medium volume liquid waste generation. The initial high cost of purchasing many of these systems is beyond the economic resources of many businesses, thus prohibiting cost-effective recycling for environmental compliance or beneficial reuse.

Multi-cell electrodialysis stacks are normally built up of membrane sheets separated from each other by suitable gaskets. For efficient separations, the distance (gap) between the sheets is as small as possible. In most designs, a spacer is introduced between the individual membrane sheets, both to assist in supporting the membrane and to help control the liquid flow distribution. The stacks for most electrodialysis processes are assembled in the same fashion as a plate-and-frame filter press, the gaskets corresponding to the frames and the membrane sheets corresponding to the plates. The manifolds that are needed to distribute the process fluids to the various compartments or channels are formed by ingenious patterns of mating holes and slots punched in the gaskets and sometimes in the membranes themselves, prior to assembly of the stack. Several different gasket and spacer materials and arrangements and channel geometries have been utilized or proposed.

In typical electrodialysis systems, the flow pattern within each compartment (i.e., between any two successive membranes) is determined by the configuration of the spacer element used between the membranes. Two distinctively different flow arrangements are typically used. One is known as the tortuous-path design; the other makes use of the sheet-flow principle. The most serious design problem for both flow arrangements for multi-membrane and multi-cell stacks is that of assuring uniform fluid flow to the various compartments and effective transport of the ions to the membrane surfaces. These difficulties are the major obstacles to simple, single stage demineralization of brackish liquids.

In particular, reducing concentration polarization is one of the most important design issues for electrodialysis. Concentration polarization is the reduction of ion concentrations near the membrane surface compared to those in the bulk solution flowing through the membrane compartment. With substantial concentration polarization, electrolytic water splitting in order to provide the requisite electric current carriers through the membranes occurs due to the deficiency of solute ions adjacent to the membranes that can carry the current. This water splitting is extremely detrimental to electrodialysis efficiency. The tendency of concentration polarization to take place at the surface of the membranes is due to the hydrodynamic characteristic of channel flow, in which there is a central turbulent core of flow bounded by thin viscous boundary layers adjacent to the confining surfaces. These viscous boundary layers impose a resistance to the passage of ions much greater than that of a layer of like thickness in the turbulent core, and hence increase the likelihood of polarization at the membrane surfaces. Polarization is objectionable not only from the standpoint of the inefficient increase in energy consumption, but also the change of pH of the concentrate stream as a result of water splitting, which tends to cause scale deposition.

When dealing with fluids with very low total dissolved solids (TDS), back diffusion can take place. Back diffusion occurs when the ion concentration in the concentrate stream is substantially higher than the ion concentration in the de-mineralized stream. The result is that some of the ions from the concentrate stream diffuse back through the membrane, against the force of the DC potential, into the de-mineralized stream.

The number of cells in a stack is limited mainly by the practical considerations of assembly and maintenance requirements. Since the failure of a single membrane can seriously impair stack performance, the necessity to be able to disassemble and reassemble a stack to replace a membrane, and the necessity to be able to perform this quickly and easily, effectively limits the number of membranes that can be practically utilized in a stack. As a result, it is often desirable to use several smaller modular-size stacks rather than one large one. This problem has been attacked by using several small subassemblies or packs containing about 50 to 100 cell pairs (CP), and arranging as many as 10 of these packs in series in a single clamping press. A single set of electrodes may be used for the entire assembly (stack) or several electrodes may be used to provide electric staging. However, use of single electrodes for larger assemblies typically causes end-cell heating that results in rapid membrane deterioration.

The present invention serves to expand the possible applications of electrodialysis in that it represents an efficient, small scale electrodialysis system with a configuration allowing cost-effective small-scale applications, while making the large scale applications even more cost-competitive than they currently are.

In accordance with the present invention, a unique gasket design reduces hydraulic pressure drop across the cell stack assembly by eliminating narrow inlet/outlet manifold cutouts inherent with conventional designs. The reduction of hydraulic pressure permits the use of higher flow rates that further reduce concentration polarization, as well as thinner membranes, resulting in improved desalting efficiency, especially for sparingly conductive solutions, and also less sensitivity to the presence of suspended matter.

The novel multiple split cell design can be operated in parallel as a roughing de-mineralizer (or operated in a batch recirculation mode) or operated in series allowing for single-pass continuous flow. When operated in the series mode, the split cell design permits separate voltage and flow control when a higher purity fluid is desired. The split cell design permits separate cell control of concentrate stream salinity content. The roughing cell may be operated with a higher concentrate stream TDS, with the salinity of the polish cell concentrate stream correspondingly reduced to the salinity content of the de-mineralized stream. This prevents back diffusion and allows for efficient removal of ions in feed water of low TDS. In short, the split cell design incorporates the benefits of hydraulic and electrical staging without the inherent complexity and expense of commercial electrodialysis systems.

The split cell design minimizes the voltage potential across the stack, thereby reducing end-cell heating that leads to membrane deterioration.

It is an object of the present invention to provide a simpler stack assembly of low production cost. Stack assembly cost is reduced as a result of the novel split cell/gasket geometry. A reduced number of expensive machined components are required. Simpler and lighter components lower material costs for a given membrane area. Inexpensive center bolts provide an alternative to typical hydraulic force application arrangements, which also improves the uniformity of the clamping force distribution on the gasket area. Threaded bolts also reduce assembly labor time, i.e., it is easier to hold the configuration in place and also facilitate change-out of membranes when they are spent, as the cell geometry reduces stress on the end points as is found inherent with some conventional stack assemblies.

It is another object of the present invention to provide an apparatus and method that allows for the cost-effective arrangement of two or more split membrane cells that enables the ingenious arrangements of plumbing for optimizing deionization processing.

The cell gasket geometry can be more easily and inexpensively fabricated from a larger range of materials in comparison to conventional designs, allowing the process to be used in more harsh environments through the use of a wide range of chemically resistant materials. It is still another object of the present invention to provide an apparatus and method that combines a unique arrangement of small to intermediate scale unit operations for the economical recovery/reclamation of a wide range of fluids and that can also be scaled to a large system size, further improving the economics of large scale electrodialysis systems by reducing both capital and operating costs.

BRIEF SUMMARY OF THE INVENTION

According to one embodiment of the present invention, a dialysis stack is provided in which each generally planar gasket defines a first cell and a second cell. A membrane is located adjacent to each side of each gasket. A turbulence spacer is located within each cell. Each cell is provided with an inlet and an outlet to provide fluid access into and out of each cell. Fluid flows sequentially through the two cells defined in each gasket. Preferably, the fluid flows through a plurality of first cells defined by a plurality of spacers and then flows through a plurality of second cells defined in the plurality of spacers. Separate anodes and cathodes provide electrical energy to the two parallel sets of first cells and second cells. Separate rectifiers can be used to apply specific electric potential across the first set of cells and second cells when operated in series, or a single rectifier can power both the first and second cell sets when operated in parallel. A system of bolts extending through parallel compression plates are used to secure the plurality of spacers and interleaved membranes in register to define conduits extending between the plurality of cells.

The electrodialysis stack is included in an electrodialysis system. The system includes a mixing tank for the solution being processed. Mixed solution is passed through filters for removing particulate matter and potential precipitants. The filtered solution is collected in a dilute tank. Concentrated fluid is collected in a concentrate tank. Electrolyte is provided from an electrolyte tank to an anode chamber and to a cathode chamber. The anode chamber and the cathode chamber have an electrically conductive fluid connection through the cell stack. The membranes alternate between anion exchange membranes and cation exchange membranes. The cells alternate between concentrate stream cells and dilution stream cells.

BRIEF DESCRIPTION OF THE SEVERAL VIEWS OF THE DRAWINGS

The above-mentioned features of the invention will become more clearly understood from the following detailed description of the invention read together with the drawings in which:

FIG. 7a is a schematic diagram of split cell spacer having two cells arranged in series;

FIG. 7b is a schematic diagram of split cell spacer having two cells arranged in parallel;

FIG. 7c is a schematic diagram of split cell spacer having three cells arranged in series;

FIG. 7d is a schematic diagram of split cell spacer having three cells arranged in parallel;

DETAILED DESCRIPTION OF THE INVENTION

Figure 1:
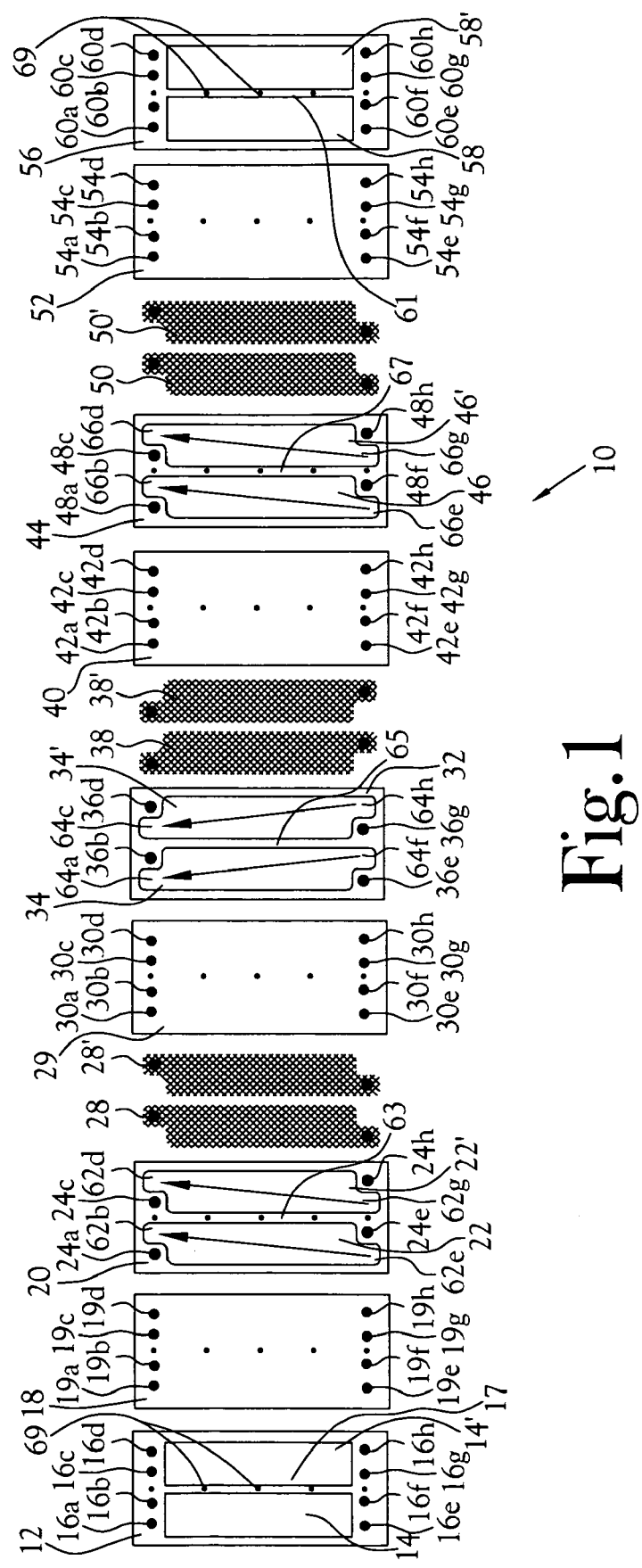
FIG. 1 is a laterally exploded view of a cell stack embodying various of the features of the present invention.

Referring to the drawings, wherein similar reference numbers denote similar elements throughout the several drawings, there are disclosed a method and an apparatus for electrodialysis treatment of a fluid in which a salt is dissolved. One example of such a fluid is used antifreeze, which can be cleaned and recycled in accordance with the present invention.

In FIG. 1 there is illustrated one embodiment of an electrodialysis cell stack 10, exploded laterally. At one end is an electrode stream spacer 12 defining two rectangular apertures 14 and 14' separated by partition 17 having aligned holes 69 therein for insertion of threaded members such as bolts 68. In the depicted embodiment the electrode stream spacer is approximately 14 inches by 24 inches, though it will be recognized that various sizes may be used. Also defined in the electrode stream spacer 12 are eight conduit apertures 16a, 16b, 16c, 16d, 16e, 16f, 16g and 16h.

Adjacent to the electrode stream spacer 12 is an anion exchange membrane 18, many of which are well known in the art. One commercially available material is Neosepta AFN produced by Tokuyama Corporation. The anion exchange membrane 18 is shaped and sized substantially identically to the electrode stream spacer 12 and includes conduit apertures 19a–h in register with the conduit apertures 16a–h defined in the electrode stream spacer 12. The anion exchange membrane 18, and similar shaped and sized membranes 29, 40, 52 described herein, have aligned holes 69 along a mid-length in register with holes 69 defined in electrode stream spacer 12.

Adjacent to the anion exchange membrane 18 is a concentrate split cell spacer 20 defining two apertures 22 and 22' separated by partition 63 having aligned holes 69 therein. Each of the apertures 22 and 22' has the shape of an abbreviated rectangle in which two squares have been removed from diagonally opposed corners and all corners have been rounded. Conduit apertures 24a, 24c, 24e and 24h are defined in the concentrate split cell spacer. The concentrate split cell spacer 20 is shaped and sized substantially identical to the electrode stream spacer 12. The aperture 22 is in register with the rectangular aperture 14 and the aperture 22' is in register with the rectangular aperture 14'.

A concentrate turbulence spacer 28 is located within the aperture 22 and a concentrate turbulence spacer 28' is located within the aperture 22'. Each of the concentrate turbulence spacers 28 and 28' are formed from a mesh to maintain turbulence within the apertures 22 and 22' as concentrate fluid passes through the apertures 22 and 22'.

Adjacent to the concentrate turbulence spacer 28 is a cation exchange membrane 29, many of which are well known in the art. One commercially available material is Neosepta CMX produced by Tokuyama Corporation. The cation exchange membrane 29 is shaped and sized substantially identical to the electrode stream spacer 12 and includes conduit apertures 30a–h in register with the conduit apertures 16a–h defined in the electrode stream spacer 12.

Adjacent to the cation exchange membrane 29 is a dilution stream split cell spacer 32 defining two apertures 34 and 34' separated by partition 65 having aligned holes 69 therein. Each of the apertures 34 and 34' has the shape of an abbreviated rectangle in which two squares have been removed from diagonally opposed corners and all corners have been rounded. The apertures 22 and 22' are mirror images of the apertures 34 and 34'. Conduit apertures 36b, 36d, 36e and 36g are defined in the dilution stream split cell spacer 32. The dilution stream split cell spacer 32 is shaped and sized substantially identically to the electrode stream spacer 12. The aperture 34 is in register with the rectangular aperture 14 and the aperture 34' is in register with the rectangular aperture 14' to provide electrically conductive fluid connection to the apertures 14 and 14', respectively.

A dilution stream turbulence spacer 38 is located within the aperture 34 and a concentrate turbulence spacer 38' is located within the aperture 34'. Each of the concentrate turbulence spacers 38 and 38' is formed from a mesh to maintain constant turbulence within the apertures 34 and 34' as dilution fluid passes through the apertures 34 and 34'.

Adjacent to the dilution stream turbulence spacer 38 is an anion exchange membrane 40, which is identical to anion exchange membrane 18. The anion exchange membrane 40 defines conduit apertures 42a–h in register with the conduit apertures 16a–h defined in the electrode stream spacer 12.

Adjacent to the anion exchange membrane 40 is a concentrate split cell spacer 44 defining two apertures 46 and 46' separated by partition 67 having aligned holes 69 therein. The concentrate split cell spacer is identical to the concentrate split cell spacer 20 and defines conduit apertures 48a, 48c, 48f and 48h. The aperture 46 is in register with the rectangular aperture 14 and the aperture 46' is in register with the rectangular aperture 14' to provide electrically conductive fluid connection to the apertures 14 and 14', respectively.

A concentrate turbulence spacer 50 is located within the aperture 46 and a concentrate turbulence spacer 50' is located within the aperture 46'. Each of the concentrate turbulence spacers 50 and 50' is formed from a mesh to maintain constant turbulence within the apertures 46 and 46' as concentrate fluid passes through the apertures 46 and 46'.

Adjacent to the concentrate turbulence spacer 50 is a cation exchange membrane 52, many of which are well known in the art. The cation exchange membrane 52 is shaped and sized substantially identically to the electrode stream spacer 12 and includes conduit apertures 54a–h in register with the conduit apertures 16a–h defined in the electrode stream spacer 12.

Adjacent to the cation exchange membrane 52 is an electrode stream spacer 56 defining two rectangular apertures 58 and 58' separated by partition 61 having aligned holes 69 therein. The electrode stream spacer 56 is substantially identical to the electrode stream spacer 12. Also defined in the electrode stream spacer 56 are eight conduit apertures 60a–h, which are in register with the conduit apertures 16a–h respectively.

A first end section 62b of the aperture 22 overlays the conduit apertures 19b and 30b to cooperatively define a concentrate outlet port for the aperture 22. A diagonally opposed second end section 62e overlays conduit apertures 19e and 30e to cooperatively define a concentrate inlet for the aperture 22. A first end section 62d of the aperture 22' overlays the conduit apertures 19d and 30d to cooperatively define an outlet port for the aperture 22'. A diagonally opposed second end section 62g of the aperture 22' overlays the conduit apertures 19g and 30g to cooperatively define an inlet port for the aperture 22'.

A first end section 64a of the aperture 34 overlays the conduit apertures 30a and 42a to cooperatively define a dilution outlet port for the aperture 34. A diagonally opposed second end section 64f overlays conduit apertures 30f and 42f to cooperatively define a dilution inlet for the aperture 34. A first end section 64c of the aperture 34' overlays the conduit apertures 30c and 42c to cooperatively define an outlet port for the aperture 34'. A diagonally opposed second end section 64h of the aperture 34' overlays the conduit apertures 30h and 42h to cooperatively define an inlet port for the aperture 34'.

A first end section 66b of the aperture 46 overlays the conduit apertures 42b and 54b to cooperatively define a concentrate outlet port for the aperture 46. A diagonally opposed second end section 66e overlays conduit apertures 54e and 42e to cooperatively define a concentrate inlet for the aperture 46. A first end section 66d of the aperture 46' overlays the conduit apertures 42d and 54d to cooperatively define an outlet port for the aperture 46'. A diagonally opposed second end section 66g of the aperture 46' overlays the conduit apertures 42g and 54g to cooperatively define an inlet port for the aperture 46'.

Figure 4:
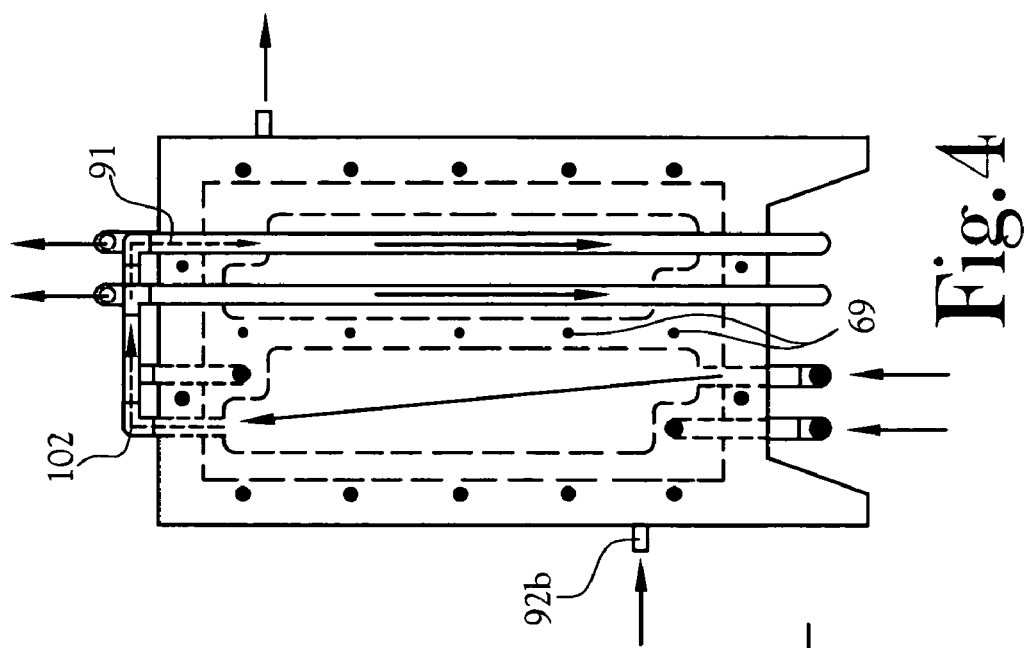
FIG. 4 is an end elevation view of a cell stack embodying various features of the present invention.
Figure 3:
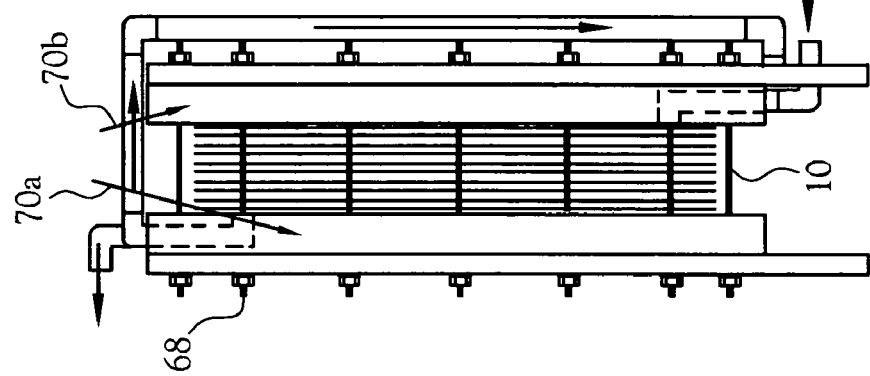
FIG. 3 is a side elevation view of a cell stack embodying various features of the present invention.
Figure 2:
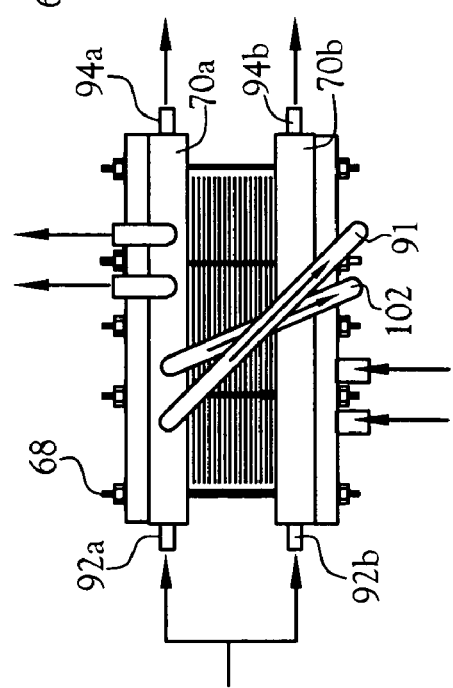
FIG. 2 is a plan view of a cell stack embodying various features of the present invention.
Figure 5:
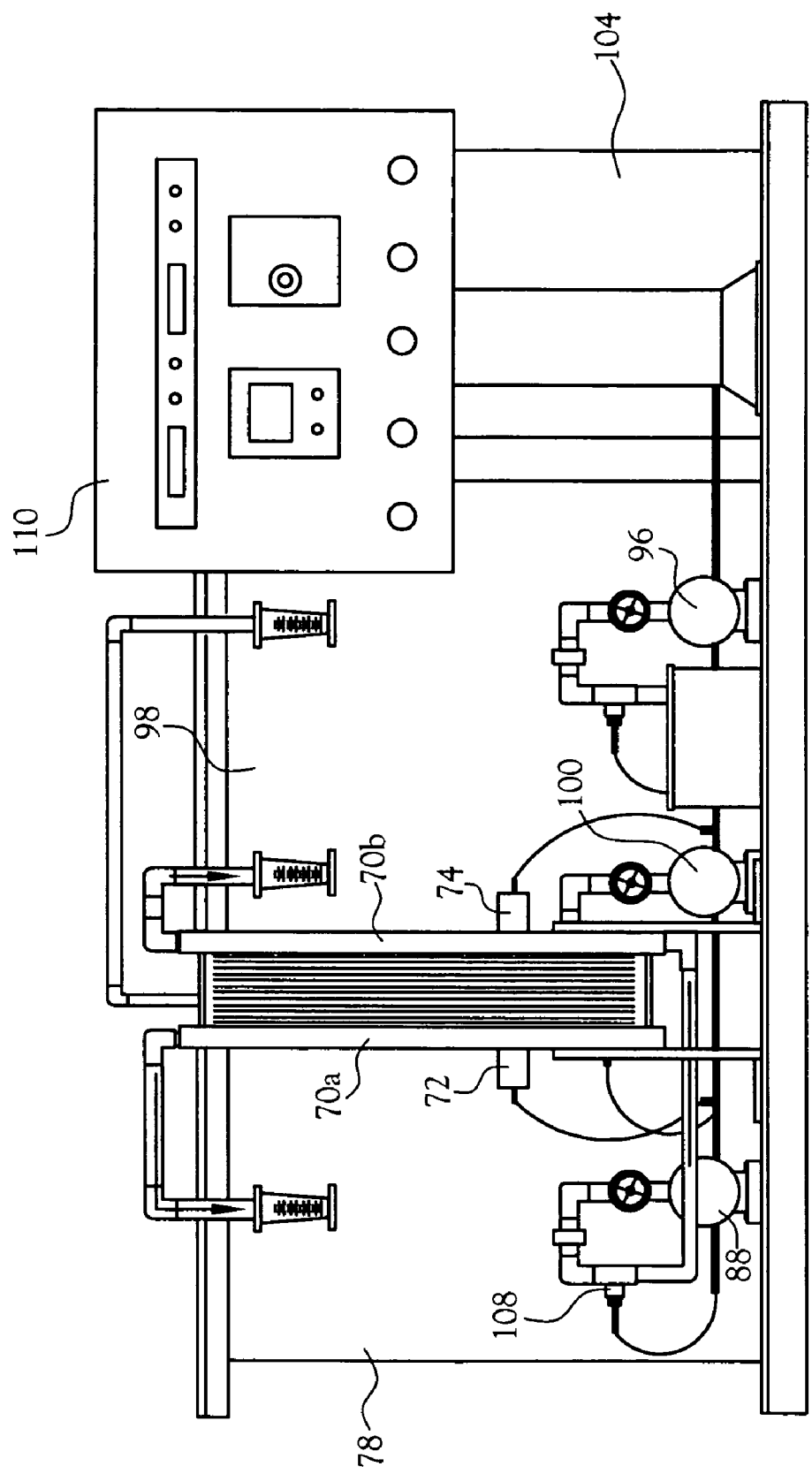
FIG. 5 is an elevation view of an electrodialysis system embodying various features of the present invention.

In FIGS. 2 and 3 the cell stack 10 is depicted as it is mounted with threaded bolts 68 between an opposed pair of electrolyte flow distribution endplates 70a and 70b. Preferably, the bolts 68 are coated with a plastic or other high electrically resistant material. The threaded bolts 68 are arranged around the periphery of the end plates 70a and 70b and also, or alternatively, extend through the holes 69 aligned in each partition providing separation space between the split cells as shown in FIG. 4. As depicted in FIG. 5, a cathode 72 extends through the endplate 70a and an anode 74 extends through the endplate 70b. A rectifier 75 applies a potential between the cathode 72 and the anode 74. An electrolyte solution supplied to the endplates 70a and 70b, a concentrate stream sequentially supplied to the apertures 22, 22', 46' and 46 and a dilution stream sequentially supplied to the apertures 34 and 34' provide electrically conductive fluid connection between the cathode 72 and the anode 74.

The split-cell spacers comprise EPDM (ethylene propylene diene terpolymer) sold under the name Nordel by E. I. Du Pont de Nemours and Company. When assemble and secured with threaded bolts 68 no glue or other adhesive is required between the membranes and the spacers.

Figure 6:
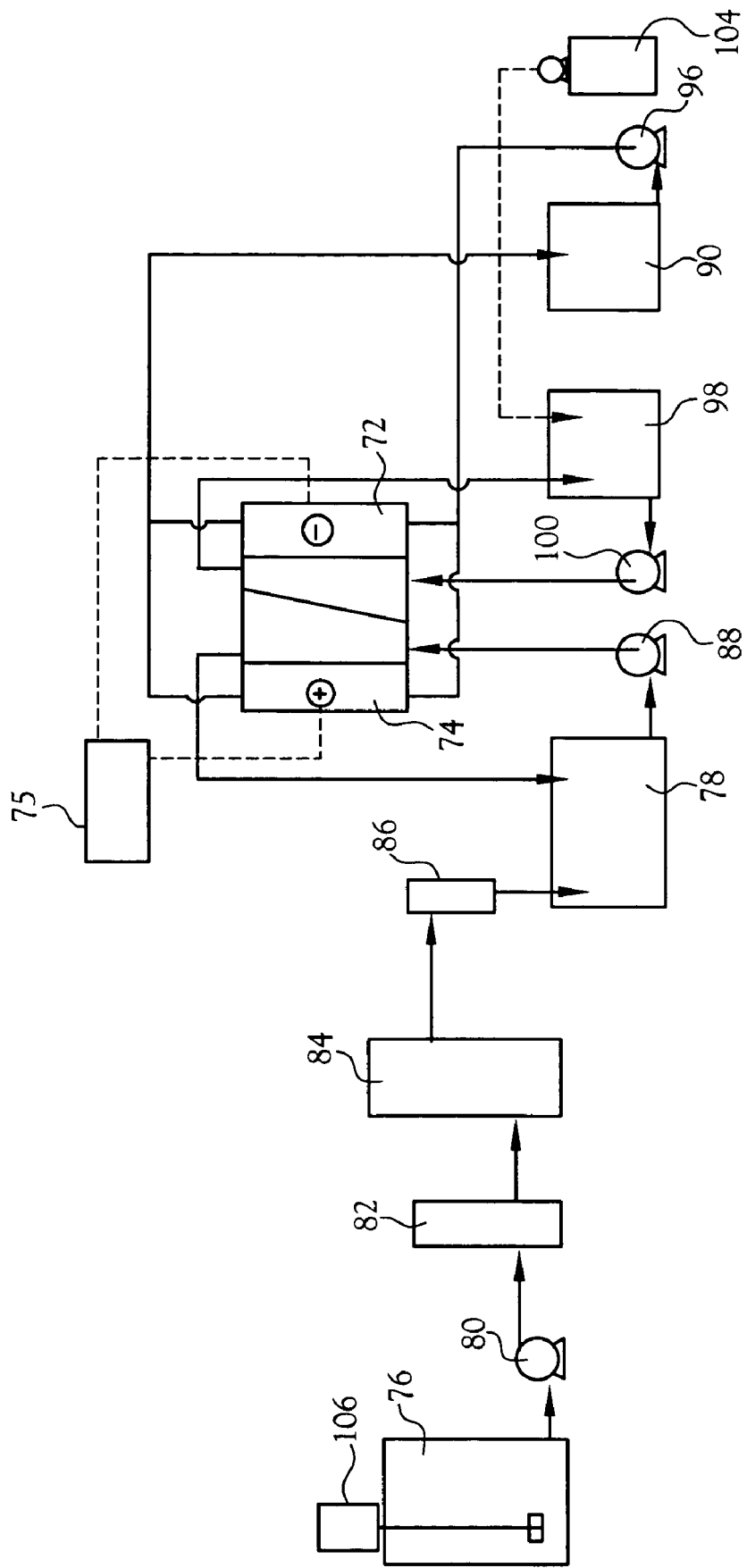
FIG. 6 is a flow diagram of an electrodialysis system embodying various features of the present invention.

Referring now to FIG. 6, there is depicted a flow diagram of an electrodialysis system adapted for using the cell stack described hereinabove. The system is portable and may be easily moved to locations where fluids require cleaning. For example, used antifreeze is stored in a mixing tank 76, where it is mixed with a metal reducing agent to precipitate metals in the fluid. The mixing tank 76 is in flow communication with a desalinated tank 78 through a filter pump 80, a 1 micron filter 82, a carbon adsorber 84 and a second 1 micron filter 86.

The desalinated tank 78 is in flow communication by conduits, through a pump 88 to the conduit apertures 60f, 54f, 48f and 42f (in series) to enter the inlet of aperture 34. The outlet of the aperture 34 is connected in flow communication with the inlet of the aperture 34' by a conduit 91. The outlet of the aperture 34' is in flow communication with the desalinated tank by conduit apertures 30c, 24c, 19c and 16c.

An electrolyte is stored in an electrolyte rinse tank 90, which is connected through conduits to the inlets 92a and 92b of the end plates 70a and 70b, respectively. The outlets 94a and 94b from the endplates 70a and 70b, respectively, are connected back to the electrolyte rinse tank 90. A pump 96 circulates the electrolyte.

A pump 100 sends concentrated brine from a concentrate brine tank 98 through the conduit apertures 60e and 54e to enter the inlet of aperture 46. From the outlet of the aperture 46 the brine is directed through the conduit apertures 42b, 36b and 30b to the inlet of the aperture 22. From the outlet of the aperture 22 the brine is directed through the conduit apertures 19e and 16e, a conduit 102, and conduit apertures 60g and 54g to the inlet of aperture 46'. From the outlet of the aperture 46' the brine is directed through the conduit apertures 42d, 36d and 30d to the outlet of the aperture 22'. From the outlet of the aperture 22' the brine is directed back to the concentrated brine tank 98 via the conduit apertures 19g and 16g. The concentrated brine tank 98 is in flow communication with a concentrate neutralization tank 104.

In operation, electrolyte is circulated between the electrolyte rinse tank 90 and the end plates 70a and 70b. The pH of the electrolyte is monitored for maintenance in a generally constant range. As required, neutralization acid may be added from the tank 104.

Concentrated brine is circulated from the tank 98, sequentially through the apertures 46, 22, 46' and 22' and then back to the tank 98. The concentration of the brine is monitored for maintenance in a generally constant range. As required, water may be added to the tank 98. A "feed and bleed" mode of operation is provided for make-up water. The pH is also monitored and controlled.

The fluid to be cleaned, such as used antifreeze, is entered into the mixing tank 76 where a stirrer 106 maintains agitation of the fluid with a metal reducing agent. The fluid is then pumped through the filter 82, the carbon adsorber 84 and the filter 86 to the desalinated tank 78. The fluid is circulated from the desalinated tank 78, sequentially through the apertures 34 and 34', and then back to the desalinated tank. As is well recognized in the field of electrodialysis, the potential applied between the cathode 72 and anode 74 induce the ions of salts in the fluid to pass through the membranes into the brine solution passing through the adjacent aperture, thus increasing the concentration of salts in the brine solution and reducing the concentration of salts in the treated fluid. By cycling the fluid repeatedly through the apparatus, the concentration of salts can be reduced to the desired minimal level. A conductivity sensor 108 monitors the fluid as it leaves the pump 88 to determine when a satisfactory level has been reached. A control panel 110 provides visual readouts and controls for operating the system.

EXAMPLE 1

| Parameter | Conventional Multi-Compartment Stack | Multi-path Split Cell (Operated in parallel) |
| --- | --- | --- |
| Glycol content % w. | 40.0 | 40.0 |
| Glycol Retention % | 91.8 | 99.9 |
| Starting conductivity (μMho/cm) | 3,800 | 3,800 |
| Finish Conductivity (μMho/cm) | 1,000 | 1,000 |
| Cell pair Voltage (V) | 1.0 | 1.0 |
| Membrane type | Conventional | Conventional |
| Solution temperature (° F.) | 76 | 76 |
| Production Rate (m³/day/m² of membrane) | 0.44 | 2.0 |
| Gasket Material | EPDM | EPDM |

(The anion exchange membrane used was Neosepta AFN produced by Tokuyama Corporation. The cation exchange membrane used was Neosepta CMX produced by Tokuyama Corporation.)

The multi-path split cell system was substantially less costly to produce than the conventional multi-compartment stack, yet operated at a production rate over four times greater.

Studies indicate that the configuration of the invention is a substantial improvement over traditional designs. Example 2 shows the production rate and typical % removal of NaCl for the current invention; those skilled in the art will recognize these values allow the invention to be economically competitive for a variety of feeds. Example 3 shows typical membrane area and energy requirements for desalination using traditional ED stack designs contrasted with the performance of the current invention. Those skilled in the art will recognize that the improved design of the current invention results in a stack requiring significantly less membrane area and that is significantly more energy efficient.

EXAMPLE 2

| 1. NaCl Feed Concentration | Production Rate (m³/m² day) | % NaCl Removal |
|---|---|---|
| 1.65 g/L | 5.74 | 91 |
| 16.5 g/L | 1.50 | 99 |

EXAMPLE 3

| NaCl Feed Concentration | Traditional Designs** | Split cell | % Reduction |
|---|---|---|---|
| A. Membrane Area (m²) for 1 m³/day Capacity* | | | |
| 1 g/L | 0.3 | 0.17 | 42% |
| 10 g/L | 1.2 | 0.67 | 44% |
| B. Energy Requirements (kw-hr/m³ product)* | | | |
| 1 g/L | 1.2 | 0.26 | 78% |
| 10 g/L | 3.4 | 2.67 | 21% |

*For a product concentration of 500 ppm TDS.
**Source: Strathmann, H., "Design and Cost Estimates", in Membrane Handbook, pp. 246–254, W. S. W. Ho and K. K. Sirkar, eds., Van Nostrand Reinhold, New York (1992).

An important variable describing an ED system is the current utilization efficiency. The current utilization efficiency is primarily influenced by the ED stack design and flow velocities but also to a lesser extent by the concentration and composition of the feed stream. For a given ED stack (gasket design, spacer design, etc.) and feed stream, the current efficiency is [1,2,3,4,5]:

$$\xi = \frac{zFQ_f(C^d_{inlet} - C^d_{outlet})}{NI} \times 100\% \quad (1)$$

where
$\xi$ = current utilization efficiency, %
z = charge of ion
F = Faraday's constant, 96,485 Amp-s/mol
$Q_f$ = diluate flow rate, L/s
$C^d_{inlet}$ = diluate ED cell inlet ion concentration, mol/L
$C^d_{outlet}$ = diluate ED cell outlet ion concentration, mol/L
N = number of cell pairs
I = applied current, Amps.

Those skilled in the art will recognize that current utilization efficiencies should be >70% for efficient use of ED for desalting typical brackish water feeds, and that current utilization decreases as the product water concentration decreases. Chart 1 shows that the invention provides excellent current utilization efficiencies (>90%) over a wide range of product water concentrations. The figure also shows that good current utilizations are achieved even when producing high quality product (<5 mg/L Cl⁻). Also, studies indicate that the invention is capable of producing a product with extremely low conductivity levels (down to as low as 2.6 μMho/cm). Those skilled in the art will recognize that this represents a substantial improvement compared to traditional ED designs, which are typically limited to product with conductivities >30 μMho/cm. As a result, the invention would represent a new pretreatment option for production of ultrapure water.

While the depicted embodiment has been described in terms of three split cell spacers and four membranes, it will be recognized that additional split cell spacers and membranes are desirable to speed the process. Such additional apparatus would function in substantially the same manner.

Figure 7G:
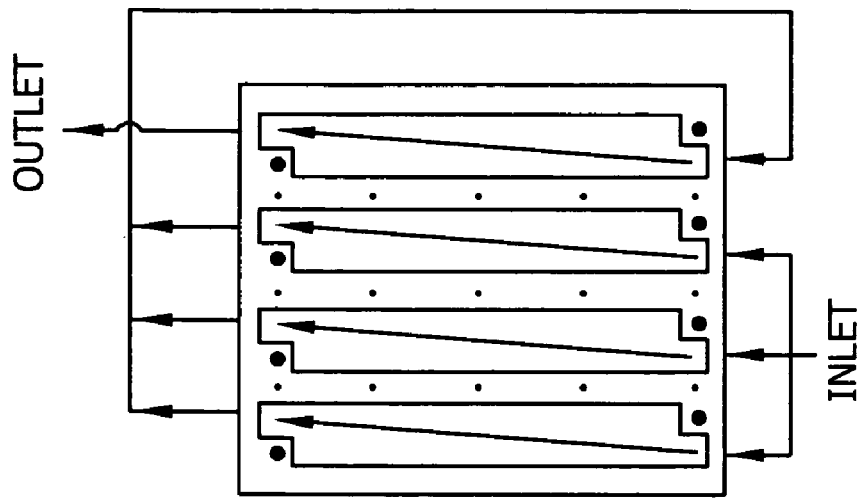
FIG. 7g is a schematic diagram of split cell spacer having four cells with three cells arranged in parallel arranged in series with a single polish cell.
Figure 7F:
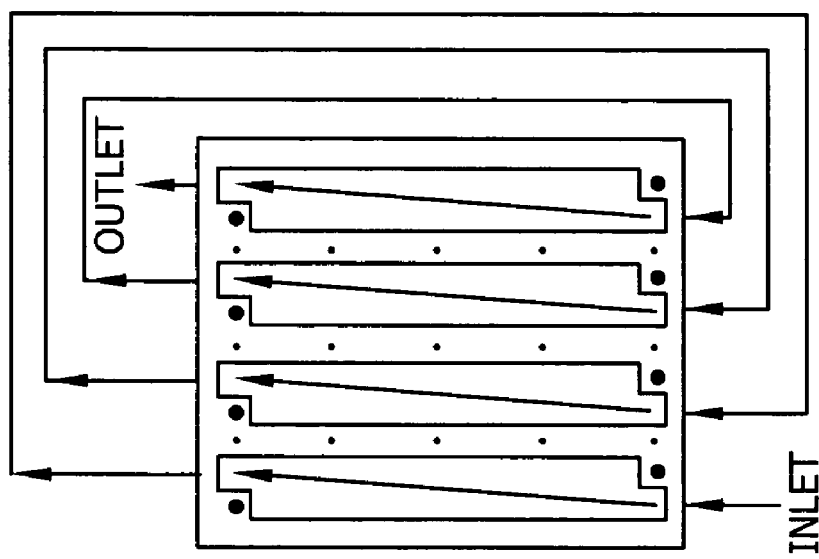
FIG. 7f is a schematic diagram of split cell spacer having four cells arranged in series.
Figure 7E:
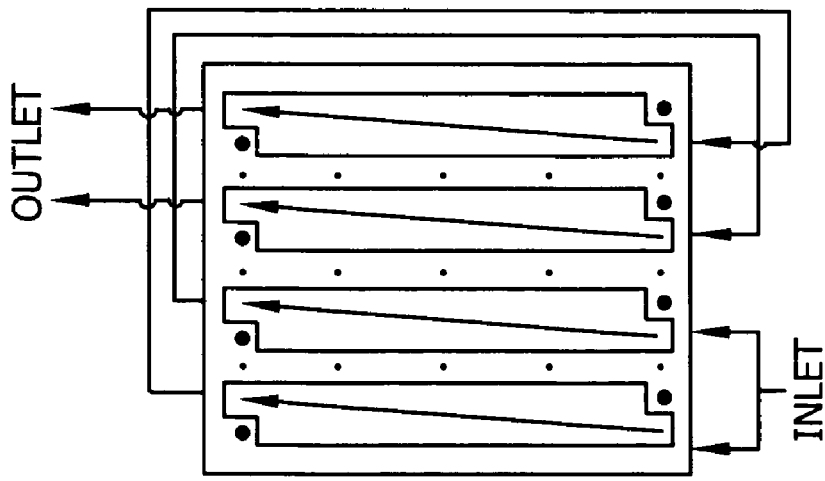
FIG. 7e is a schematic diagram of split cell spacer having four cells with two parallel cells arranged in series with two parallel cells.
Figure 8:
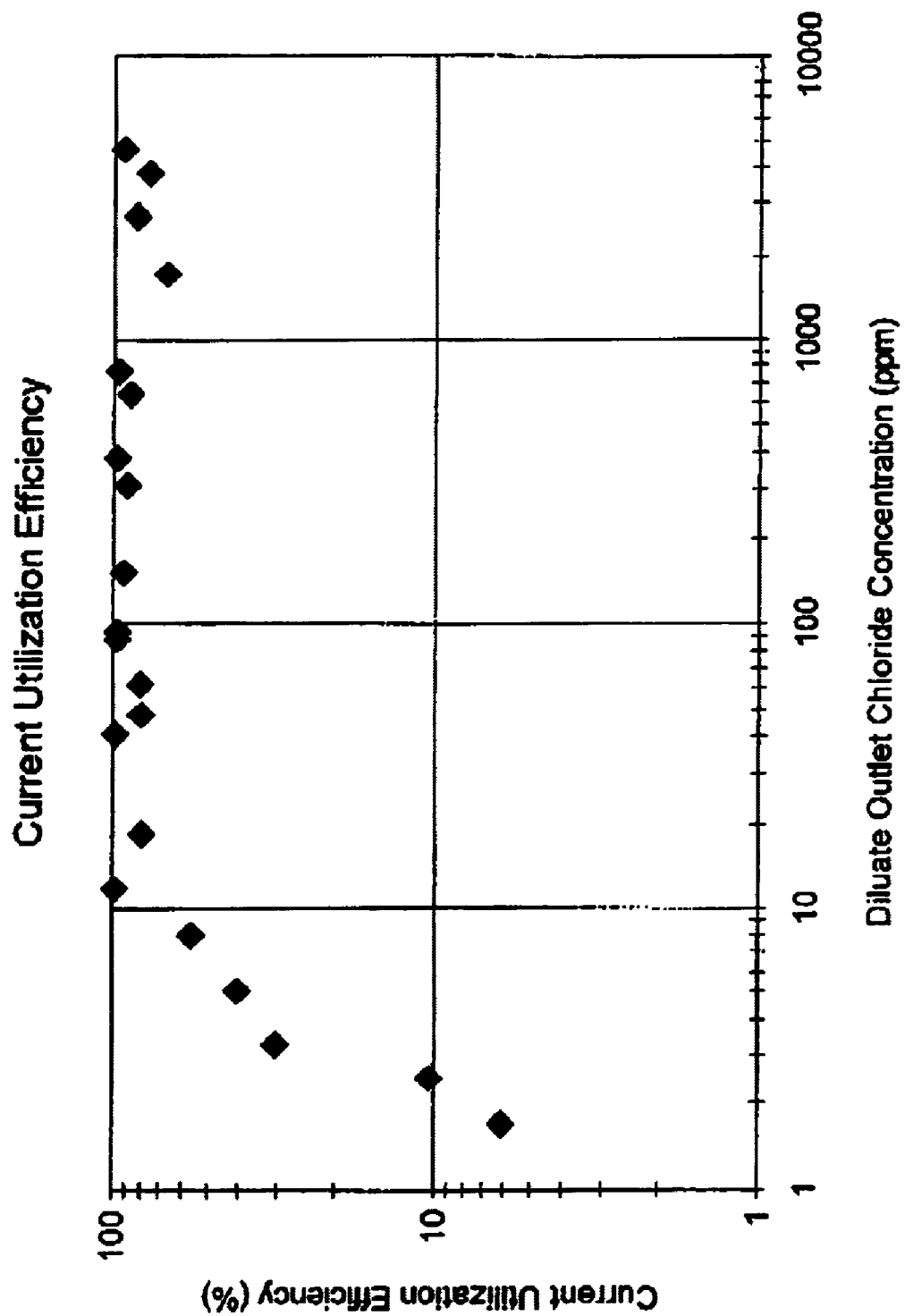
FIG. 8 is a chart of Current Utilization Efficiency.

As depicted schematically in FIGS. 7a to 7g, the split cells may be arranged with more than two cells and the cells may be arranged in a variety of parallel, serial and parallel/serial arrangements. FIG. 7a depicts the arrangement described herein above. FIG. 7b depicts an arrangement wherein the two split cells are arranged in parallel. FIG. 7c depicts a split cell having three apertures that are arranged serially. FIG. 7d depicts a split cell having three apertures that are arranged in parallel. FIG. 7e depicts a split cell having four apertures that are arranged with two parallel cells arranged serially with another set of parallel cells. FIG. 7f depicts a split cell having four apertures that are arranged serially. FIG. 7g depicts a split cell having four apertures with three cells arranged in parallel and all three serially feeding the fourth cell. It will be recognized by those skilled in the art that the multiple cells may be arranged in a variety of ways to accommodate many different electrodialysis situations.

Benefits of the process include a recovery rate in excess of 95%, high throughput and low capital and operating cost. The system does not generate hazardous by-products. It is easy to operate, control and automate, and easy to maintain. Also, studies indicate that the invention is capable of producing a product with extremely low conductivity levels (down to as low as 2.6 μMho/cm). Those skilled in the art will recognize that this represents a substantial improvement compared to traditional ED designs, which are typically limited to product with conductivities >30 μMho/cm. As a result, the invention would represent a new pretreatment option for production of ultrapure water.

The multi-path split-cell spacer design permits use of a single or multiple central bolts, eliminating the need for an expensive hydraulic clamping assembly for applying central pressure on the stack and providing a uniform force distribution over the gasket area, improving the seals between membranes and improving ion removal efficiency, while also reducing assembly labor time. Expensive machined components are replaced with simpler, lighter components having lower material costs, for a given membrane area assemblies.

In addition to the described use of the method and apparatus to clean used antifreeze, the system may be used to clean and/or recycle: wash water (vehicular, laundry, mop water, trailer/tank washout, textile rinses, metal, aqueous parts cleaners), oil and gas field fluids (glycol base natural gas dehydration fluids, glycol/water heat transfer fluids, amines from treatment of natural gas, produced water), other thermal transfer fluids (secondary coolants from HVAC systems and coolants from ice-skating rinks), cooling water reuse, nuclear wastewater, mixed (nuclear and hazardous) wastewater, hazardous wastewater, desalination of sea or brackish water, drinking water production and pretreatment for ultra-pure water production.

While the present invention has been illustrated by description and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. In an electrodialysis system comprising a source of concentrate fluid, a source of dilute fluid, a collector of treated concentrate fluid, a collector of used dilute fluid, an anode,
    a cathode, a plurality of generally planar spacers, and a plurality of membranes interleaved with said spacers to define a plurality of cells providing electrically conductive fluid connection between said anode and said cathode, each of said spacers comprising:
    a gasket defining at least a first aperture and a second aperture separated by a partition having at least one hole therethrough, each of said first and second apertures defining an independent cell between interleaved membranes; and
    at least one connector member removably extended through said at least one hole through said partition between said first aperture and said second aperture.

2. The apparatus of claim 1 wherein said apertures have the shape of an abbreviated rectangle having squares removed from two diagonally opposed corners.

3. The apparatus of claim 2 wherein all corners of said apertures are rounded.

4. The apparatus of claim 1 wherein a conduit provides flow communication between said first aperture and said second aperture.

5. The apparatus of claim 1 wherein said at least one connector member is coated with an electrically resistant material.

6. A method of electrodialysis treatment comprising the steps of:
    providing a source of concentrate fluid;
    providing a source of dilute fluid;
    providing a collector of treated concentrate fluid;
    providing a collector of used dilute fluid;
    providing an anode;
    providing a cathode;
    securing a plurality of generally planar spacers and a plurality of membranes interleaved with said spacers to define a plurality of cells, said step of securing including each of said spacers having a gasket defining at least a first aperture and a second aperture separated by a partition having at least one hole therein and through which are removably inserted at least one connector coated with an electrically resistant material, each of said first and second apertures defining an independent cell between two common interleaved membranes;
    providing electrically conductive fluid connection between said anode and said cathode; and
    providing flow communication from said first aperture to said second aperture.

7. The method of claim 6 wherein said apertures have the shape of an abbreviated rectangle having squares removed from two diagonally opposed corners.

8. The method of claim 7 wherein all corners of said apertures are rounded.

9. An electrodialysis system comprising a source of concentrate fluid, a source of dilute fluid, a collector of treated concentrate fluid, a collector of used dilute fluid, an anode, a cathode, a plurality of generally planar spacers, and a plurality of membranes interleaved with said spacers to define a plurality of cells providing electrically conductive fluid connection between said anode and said cathode, each of said spacers comprising:
    a gasket defining a plurality of adjacent apertures, each of said adjacent apertures being separated by a partition having at least one hole therein and through which at least one connector is removably extended to bind together said plurality of cells, each of said apertures defining an independent cell between interleaved membranes, said apertures having the shape of an abbreviated rectangle having squares removed from two diagonally opposed corners; and
    a plurality of conduits providing flow communications between each adjacent aperture of said plurality of adjacent apertures.

10. The apparatus of claim 9 wherein all corners of said apertures are rounded.

11. The apparatus of claim 9 wherein said at least one connector is composed of non-conductive material.

12. An electrodialysis system comprising a source of concentrate fluid, a source of dilute fluid, a collector of treated concentrate fluid; a collector of used dilute fluid, an anode, a cathode, a plurality of generally planar spacers, a plurality of membranes interleaved with said spacers to define a plurality of cells providing electrically conductive fluid connection between said anode and said cathode, each of said spacers comprising:
    a gasket defining a plurality of adjacent apertures, each of said adjacent apertures being separated by a partition having at least one hole therein and through which at least one non-conductive connector is removably extended to bind together said plurality of cells, each of said apertures defining an independent cell between interleaved membranes, said apertures having the shape of an abbreviated rectangle having squares removed from two diagonally opposed corners; and
    a plurality of conduits providing flow communications between each one of said adjacent apertures of said spacers between interleaved membranes stacked within said plurality of cells.

13. The electrodialysis system of claim 12 wherein said plurality of conduits provide flow communication in series between said plurality of adjacent apertures.

14. The electrodialysis system of claim 12 wherein said plurality of conduits provide flow communication in parallel between said plurality of adjacent apertures.

* * * * *